(No Model.)
F. L. ROBISON.
BALING PRESS.
No. 529,083. Patented Nov. 13, 1894.
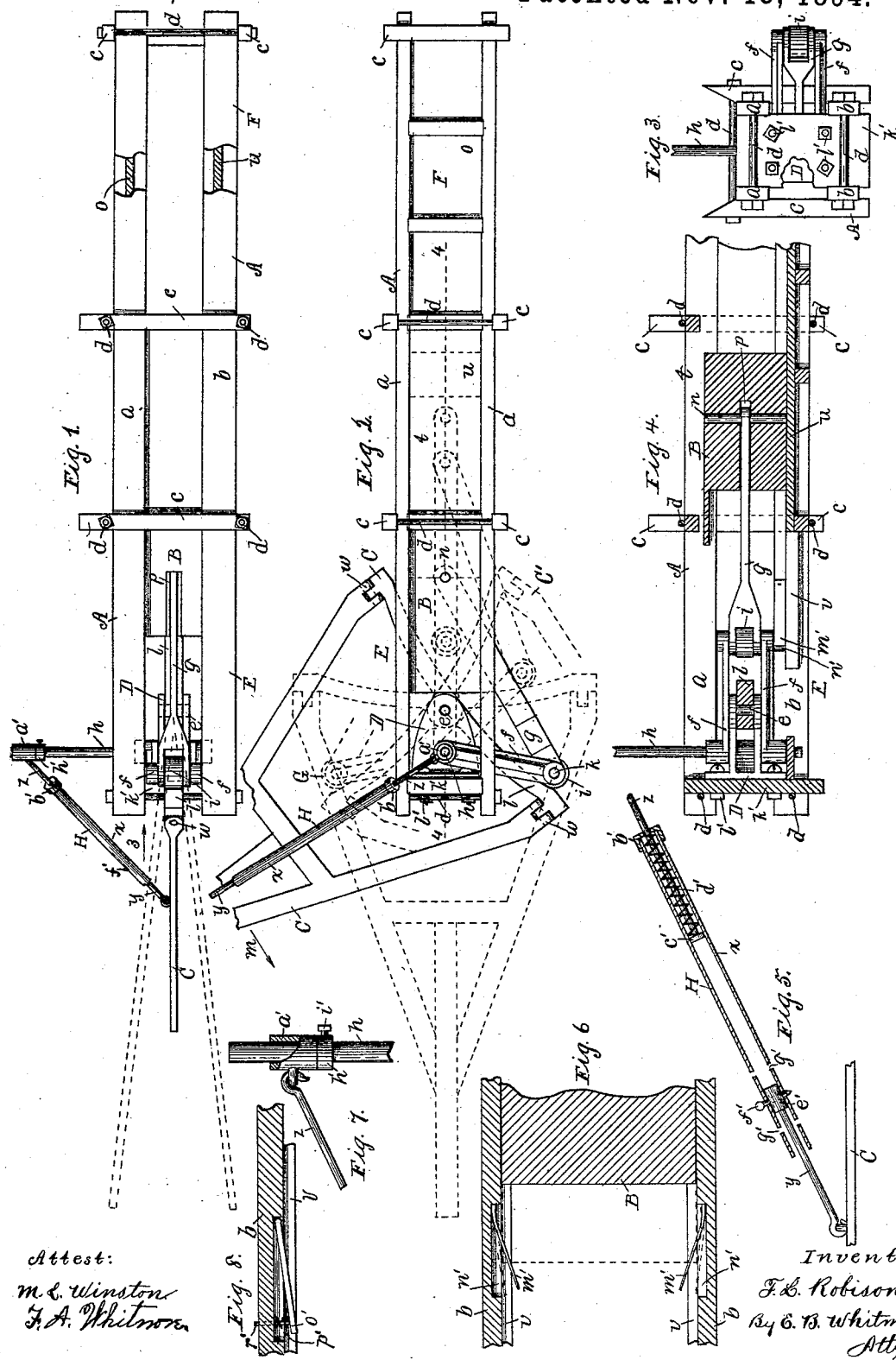
Attest:
M. L. Winston
F. A. Whitmore
Inventor
F. L. Robison,
By E. B. Whitmore,
Atty.

UNITED STATES PATENT OFFICE.

FRANK L. ROBISON, OF ALBION, ASSIGNOR OF ONE-HALF TO ALASCO C. ROBISON, OF CANANDAIGUA, NEW YORK.

BALING-PRESS.

SPECIFICATION forming part of Letters Patent No. 529,083, dated November 13, 1894.

Application filed July 12, 1893. Renewed October 4, 1894. Serial No. 524,928. (No model.)

*To all whom it may concern:*

Be it known that I, FRANK L. ROBISON, of Albion, in the county of Orleans and State of New York, have invented a new and useful Improvement in Baling-Presses, which improvement is fully set forth in the following specification, and shown in the accompanying drawings.

My invention is a baling press, designed more particularly for baling hay, to be operated by horse power.

The invention consists in constructions and novelties hereinafter fully described and more particularly pointed out in the claims.

Referring to the drawings, Figure 1 is a side elevation of the device; Fig. 2, a plan, parts being shown in various positions by full and dotted lines. Fig. 3 is an end view, seen as indicated by arrow 3 in Fig. 1, with parts omitted. Fig. 4 is a longitudinal section of the forward part of the frame and other parts, taken on the dotted line 4 4 in Fig. 2. Fig. 5 is the suspender for the sweep lever, parts being in longitudinal section. Fig. 6 better shows the catch springs, parts being shown in two positions by full and dotted lines. Fig. 7 shows the means of supporting the suspender. Fig. 8 shows another form of catch spring. Figs. 5 to 8 inclusive are drawn to scales larger than that of the other figures.

Referring to the parts shown, A is the frame of the device, it being prismatic in form and composed of four longitudinal timbers $a\ a$, $b\ b$, held together by simple cross ties $c\ c$, and tie bolts $d$.

B is the driving head or plunger adapted to work longitudinally in the frame. C is the sweep lever to the outer end of which the horse is attached.

D is a stout hanger secured within the forward end of the frame to a head board $k'$ by bolts $l'$, within which the sweep lever is pivoted, at $e$, Figs. 1 and 2. This hanger also serves to hold crank arms $f\ f$ which are connected with the plunger by a pitman $g$. The hanger is horizontal, and bifurcated, the sweep lever resting between the branches, as shown. The crank arms are held upon a vertical shaft $h$ preferably made rigid therewith and adapted to turn in the hanger.

The head of the pitman is expanded vertically to fill the space between the outer ends of the crank arms, as shown in Fig. 4, and is forked to receive an anti-friction roller $i$. A vertical pin $k$, Fig. 2, passes through the crank arms, the pitman and the roller, forming a common axis for all those parts. The inner end of the pitman enters a horizontal cavity $p$ in the plunger, and is joined to the latter by a vertical pin $r$, nearly in the middle of the body of the plunger. As constructed the roller stands opposite the space in the hanger in position to be pressed by the sweep lever when the latter is turned to actuate the plunger.

At its left-hand portion, E, the frame A is open at its sides (also at the top and bottom) and the crank arms and pitman are adapted to swing horizontally one way and the other out through the sides of the frame, the sweep lever also working in these lateral openings. When the crank arms are swung out at either side of the frame to their extreme position, as shown in Fig. 2, the plunger is drawn back out of the way so that hay may be supplied to the machine—the hay being introduced into the frame in front of the plunger through an opening $t$.

The hay is pressed in the right-hand part F of the frame, by a forward motion of the plunger in the usual manner. The sides of the part F of the frame are left open for the purpose of wiring or binding the hay, but the top and bottom are closed respectively by an upper wall $o$, and floor $u$. The plunger slides between the timbers $a\ a$, $b\ b$, and rests upon the floor $u$, tracks or cleats $v$, Figs. 4 and 6, being supplied extending back along the inner faces of the timbers $b\ b$ level with the floor $u$ for the plunger to slide on.

The sweep lever is adapted to swing laterally substantially in a horizontal plane, the horse being turned one way and then the other to draw the lever round forward and backward. Observing Fig. 2 it will be understood that if when the sweep lever is in the position shown by full lines the horse moves so as to carry it in the direction indicated by arrow $m$, the plunger will be forced toward the right on account of the pressure of the sweep lever against the roller $i$ of the pitman; and when the sweep lever has been moved to the position indicated by dotted lines at C'—nearly to its extreme position in that direction—the crank arms and the pitman will form a straight line and the plunger will have reached its extreme position toward the right or against the hay. A further slight advance of the sweep lever will carry the parts across said line, when the elasticity of the hay reacting against the plunger will throw the parts out through the other side of the frame, causing the roller to occupy the position shown by the dotted circle G.

I employ a hopper, not shown, of common construction, extending above the frame at $t$, to assist in introducing the hay into the machine in front of the plunger. The part $l$ of the sweep lever in contact with the roller is connected with the main part by movable joints $w$ $w$ so that the outer end of the sweep lever may be swung up or down as indicated by dotted lines in Fig. 1. This is for the purpose of adapting the sweep lever to the height of the horse. For example, it sometimes occurs in setting the press for work that the horse travels on footing relatively above or below the ground or floor upon which the press stands. In this case the sweep lever must be inclined either upward or downward to adapt it to the position of the horse.

An adjustable yielding suspender H for the sweep lever is employed to hold the latter in position. This suspender is held or controlled by the frame A by means of a part $h$ reaching out therefrom, and, as shown in Fig. 5, it consists of a tube $x$ and two axial rods $y$ $z$, the first connected directly with the sweep lever and the second with a thimble or part $a'$ fitted to turn horizontally upon the shaft $h$, as shown in Fig. 7. The rod $z$ passes through a cap $b'$ on the end of the tube and is adapted to slide longitudinally within the tube. The rod is formed with a head $c'$ within the tube between which head and the cap $b'$ is placed upon the rod a coiled spring $d'$, which gives to the suspender a yielding pull upon the sweep lever. The rod $y$ is likewise formed with a head $e'$ within the tube and adapted to slide therein, and a pin $f'$, passing through holes in the tube and the head serves to hold the parts rigidly together. By forming various holes, $g'$, through the tube to receive the pin the suspender may be conveniently lengthened or shortened to lower or raise the sweep lever for the purpose above stated.

The shaft $h$ is provided with a movable collar $h'$, Fig. 7, provided with a set screw $i'$ to hold it rigid with the shaft. The thimble, which turns freely upon the shaft, rests upon this collar, and the moving of the collar vertically upon the shaft constitutes another means for raising or lowering the outer end of the sweep lever.

It has been stated that the elasticity of the compressed hay causes the plunger to shoot back toward the left, along its bearings in the frame to the position shown by full lines in Figs. 1 and 2 each time after a pressure upon the hay has been completed. To prevent a violent shock of the parts when the plunger is thus thrown back, I employ catch springs $m'$, Figs. 4 and 6, held upon the inner surfaces of the frame timbers in position to catch and hold the plunger by friction. These springs not only serve to cushion the plunger as it is thrown back, but they also hold it steadily to place, out of the way of the hay which is being introduced into the machine at $t$, until again acted upon by the sweep lever. These catch springs are usually inserted in shallow cavities $n'$ in the timbers, as shown, so that their rigid ends will clear the sides of the plunger. These catches I sometimes construct as shown in Fig. 8, in which pivoted levers $o'$ act in the place of the springs $m'$, said levers being urged outward by spiral springs $p'$ back of them. A core rod $r'$ secured movably to the lever passing through the spring and out through the timber serves to hold the spring in place.

I make the edge of the sweep lever contiguous with the roller $i$ concave, as shown in Fig. 2, which causes a more favorable pressure to be brought upon the roller, when in its extreme positions, by the lever than if the said edge were straight. I also attach much importance to the matter of placing the pivotal point $e$ of the sweep lever eccentric with and forward of the pivot $h$ of the crank arms. This is preferable in many ways to pivoting the sweep lever upon the shaft $h$, one advantage being that it admits of the sweep lever being removed from the machine without disturbing the crank arms and the holding shaft $h$.

What I claim as my invention is—

1. A baling press having a frame provided at one end with a rigid hanger, in combination with a sweep lever held by the hanger, a plunger, crank arms held one above and one below the hanger, a pitman connecting the crank arms and the plunger, a vertical shaft passing through the crank arms and the hanger, and a yielding suspender for the sweep lever connecting the latter with said shaft, substantially as shown and described.

2. A baling press consisting of a frame provided with a hanger, a plunger, crank arms held by the hanger, a pitman connecting the crank arms and the plunger, and a sweep lever, in combination with a suspender for the sweep lever, a shaft held by the hanger to support the suspender and a movable collar on the shaft to regulate the elevation of the suspender, substantially as shown and described.

In witness whereof I have hereunto set my hand, this 1st day of July, 1893, in the presence of two subscribing witnesses.

FRANK L. ROBISON.

Witnesses:
  ENOS B. WHITMORE,
  M. L. WINSTON.